(12) United States Patent
Gordon et al.

(10) Patent No.: US 6,769,583 B1
(45) Date of Patent: Aug. 3, 2004

(54) CARRIER APPARATUS AND METHOD

(76) Inventors: Dean A. Gordon, 604 Lakeview St., Mary Esther, FL (US) 32569; Danny M. Fowler, 245 Lafftte Crescent, Fort Walton Beach, FL (US) 32547

( * ) Notice: Subject to any disclaimer, the term of this patent is extended or adjusted under 35 U.S.C. 154(b) by 117 days.

(21) Appl. No.: 10/260,936

(22) Filed: Sep. 30, 2002

(51) Int. Cl.[7] .................................................. B60R 9/00
(52) U.S. Cl. .................. 224/506; 224/402; 224/499; 224/519; 224/529; 224/537; 224/924
(58) Field of Search ................................ 224/402, 497, 224/499, 502, 503, 504, 505, 506, 519, 521, 524, 528, 529, 530, 533, 537, 42.32, 42.38, 42.4, 924

(56) References Cited

U.S. PATENT DOCUMENTS

| | | | |
|---|---|---|---|
| 3,963,129 A | * | 6/1976 | Clayton ..................... 414/563 |
| 4,815,638 A | * | 3/1989 | Hutyra ....................... 224/525 |
| 5,431,522 A | * | 7/1995 | Ross .......................... 414/462 |
| 5,647,719 A | * | 7/1997 | Bowlen ...................... 414/462 |
| 6,543,985 B1 | * | 4/2003 | Harstad et al. ............. 414/537 |
| 6,698,994 B2 | * | 3/2004 | Barrett ....................... 414/462 |

* cited by examiner

*Primary Examiner*—Stephen K. Cronin
(74) *Attorney, Agent, or Firm*—J. Nevin Shaffer Jr.

(57) ABSTRACT

In vehicles (16) with a trailer receiver (14), a carrier apparatus (10) includes a hitch connect (12) suspended from the trailer receiver (14). A support (20) is attached to the hitch connect (12). A ramp (22) is attached to the support (20). According to one aspect of the invention, ramp (22) includes upper ramp (24) and lower ramp (26). In another aspect of the invention, a trailer receiver brace (58) is connected to the trailer receiver (14). According to another aspect of the invention, a part (30) of support (20) forms a portion of ramp (22).

37 Claims, 4 Drawing Sheets

CARRIER APPARATUS AND METHOD

FIELD OF THE INVENTION

This invention relates to a carrier apparatus and method. In particular, according to one embodiment of the invention, the invention relates, in vehicles with a trailer receiver, to a carrier apparatus including a hitch connect suspended from the trailer receiver. A support is attached to the hitch connect and a ramp is attached to the support.

BACKGROUND OF THE INVENTION

Virtually nobody has a problem pulling a trailer in a forward direction. The difficulty with regard to operating a vehicle with a trailer attached arises when it is necessary to back up the trailer and the vehicle. In a typical situation, the vehicle includes a trailer receiver. In order to pull a trailer, a trailer hitch is inserted within the trailer receiver. The trailer hitch includes a ball to which the trailer is connected. This connection enables the trailer to swivel around the connection with the ball on the trailer hitch. Again, when moving in the forward direction it poses little or no problem since the trailer follows the vehicle. However, when it is necessary to back up a vehicle with a trailer connected in this manner, the movement of the steering wheel in one direction causes the trailer to move in the opposite direction. This creates problems for most drivers and practice is required in order to back up a vehicle with a trailer correctly.

By way of example only and not by limitation, it is common for hunters today to connect a trailer to their truck in order to transport a smaller vehicle with them to a remote hunting location. The smaller vehicle may be any type of vehicle such as a dirt bike, four wheeler, or any other such vehicle. Just pulling the trailer to the site of the hunting location can be difficult in remote environments. The process of backing the vehicle with the trailer out of remote locations, however, may be extraordinarily difficult. This difficulty is due in part to the inherent difficulty of operating a vehicle and trailer combination as discussed above. This difficulty is exacerbated, however, by the fact that these remote locations often are heavily wooded, or full of obstructions, such that room to turn around is limited. Backing out with a trailer is often nearly impossible even for skilled drivers. It is very common, in fact, for hunters to have to disconnect the trailer completely from the truck, turn the truck around, and physically manipulate the trailer such that it can be reconnected to the truck so that the truck can pull the trailer out of the area instead of backing out.

As with anything, the more parts that are required to accomplish something the more chances there are for breakdowns. Continuing with the vehicle and attached trailer example, trailers include wheels, axles, bearings, spindles, rims, lights and the like. All of these items are subject to wear and break downs. Additionally, trailers require licenses and tags which must be renewed. As a result, in addition to the difficulty in operation described above, there are high costs of operation and maintenance associated with trailers known in the art.

SUMMARY OF THE INVENTION

Accordingly, the carrier apparatus and method, according to an embodiment of the invention, includes, in vehicles with a trailer receiver, a hitch connect suspended from the trailer receiver. A support is attached to the hitch connect. A ramp is attached to the support. According to one embodiment of the invention, the ramp includes an upper and a lower ramp. According to another aspect of the invention, a trailer receiver brace is connected to the trailer receiver. In accordance with another aspect of the invention, the hitch connect includes a strong back. According to a further embodiment of the invention, the support forms a part of the ramp.

In accordance with another embodiment of the invention, in a vehicle with a trailer receiver, a carrier apparatus for carrying a smaller vehicle suspended from the back of the vehicle includes a hitch connect suspended from the trailer receiver. A H-shaped carrier is attached to the hitch connect. The arms of the H are formed by a pair of oppositely positioned ramps and the cross bar of the H is formed by a cross connecting support attached to the ramps and the hitch connect. The ramps are movably attached to the cross connection. A trailer receiver brace is attached to the vehicle. At least one step is attached to the H-shaped carrier and at least one travel bar is attached to the H-shaped carrier. According to one aspect of the invention, the ramp rests on the vehicle. According to another embodiment of the invention, a stabilizer is attached to the hitch connect and to the H-shaped carrier. In another embodiment of the invention, the stabilizer is Y-shaped.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
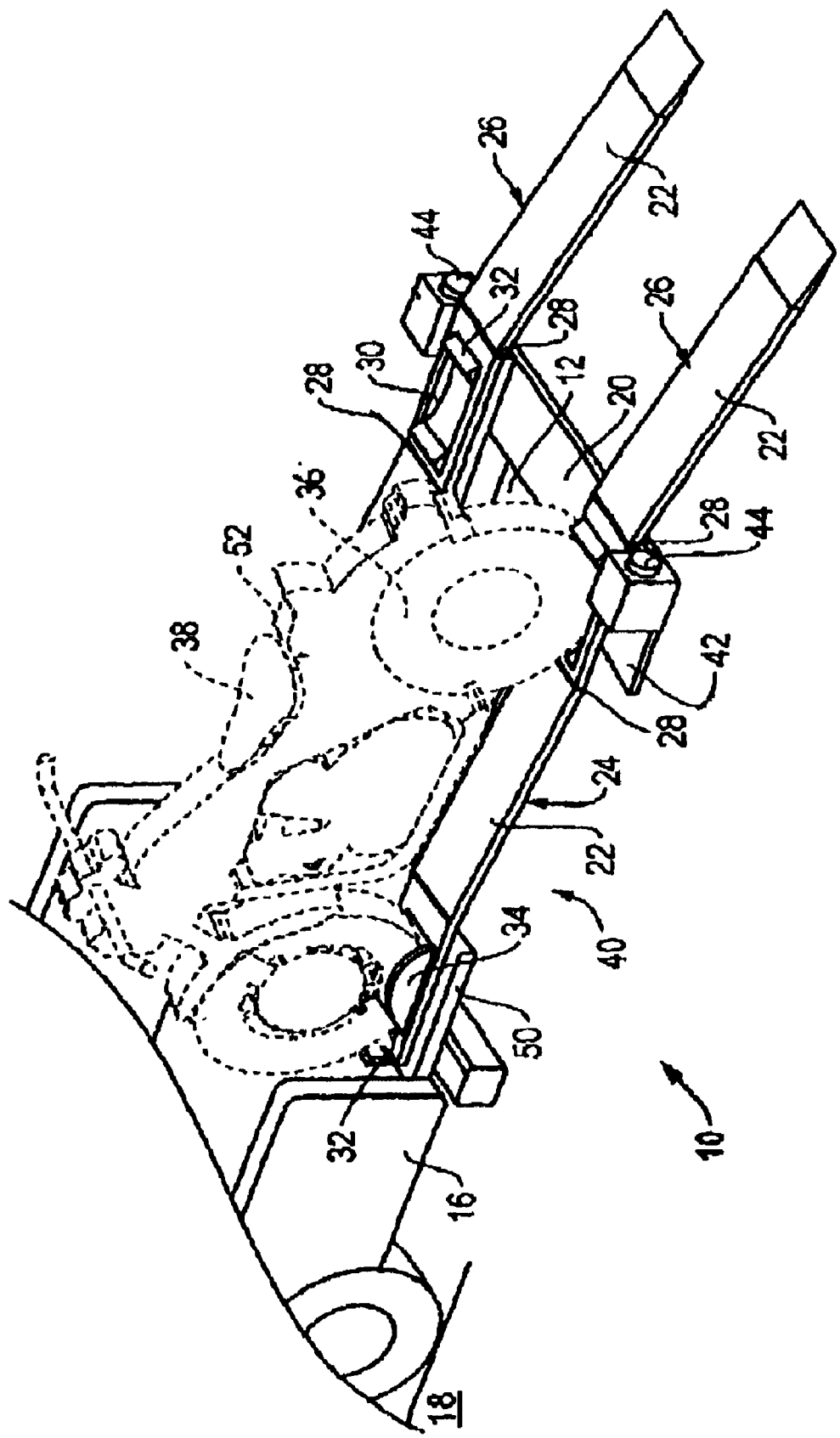
FIG. 1 is a perspective view of the carrier apparatus of the present invention according to one embodiment.
Figure 2:
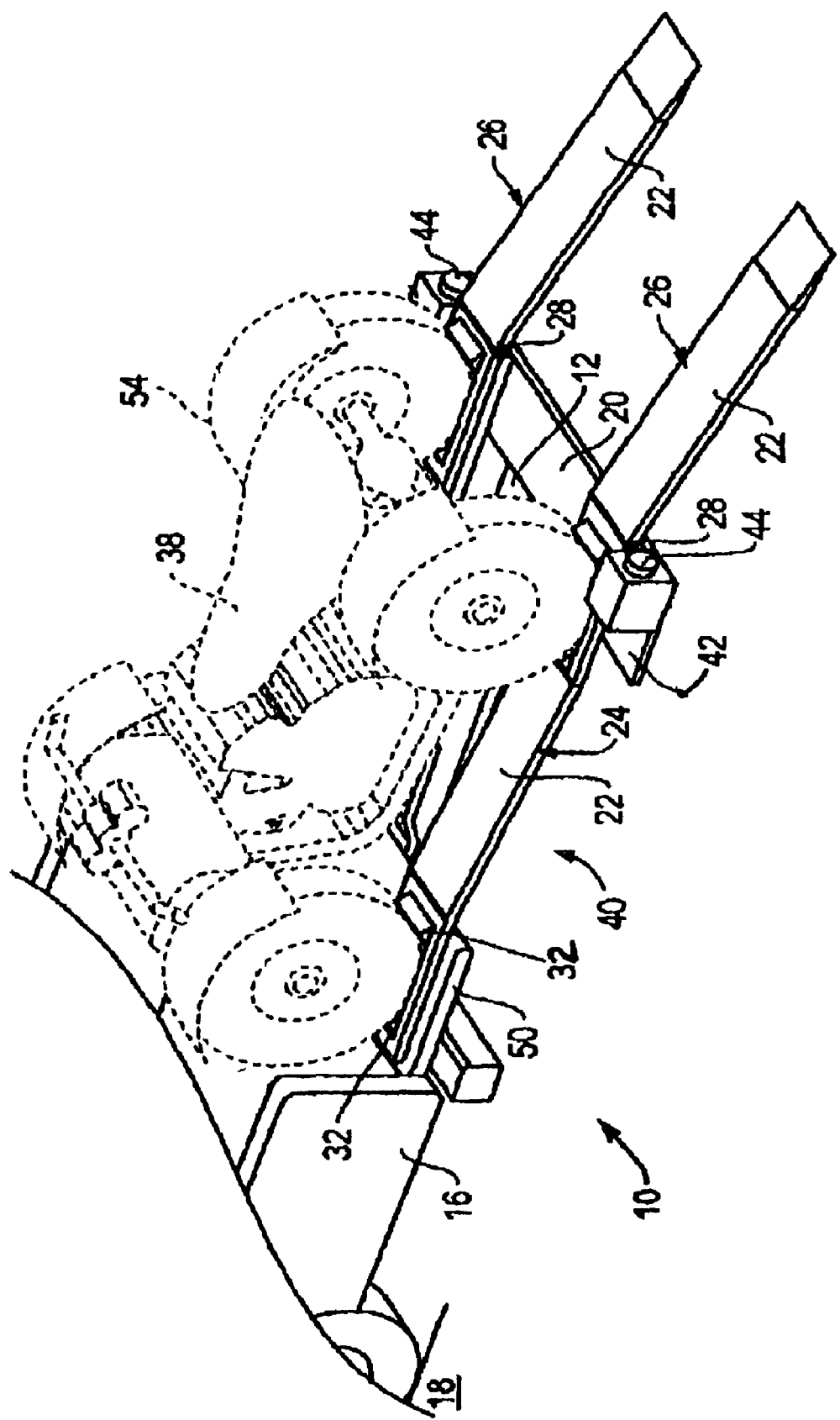
FIG. 2 is a side view of the invention of FIG. 1 with a four wheeler loaded in the carrying position.

According to an embodiment of the invention, referring now to FIG. 1, carrier apparatus 10 includes hitch connect 12 suspended from trailer receiver 14 of vehicle 16. As used herein, the term "suspended" is used to describe carrier apparatus 10 as fully supported by the trailer receiver 14 and/or vehicle 16 such that no part of carrier apparatus 10 touches the ground 18 when carrier apparatus 10 is in the travel position as illustrated in FIG. 2.

Figure 4:
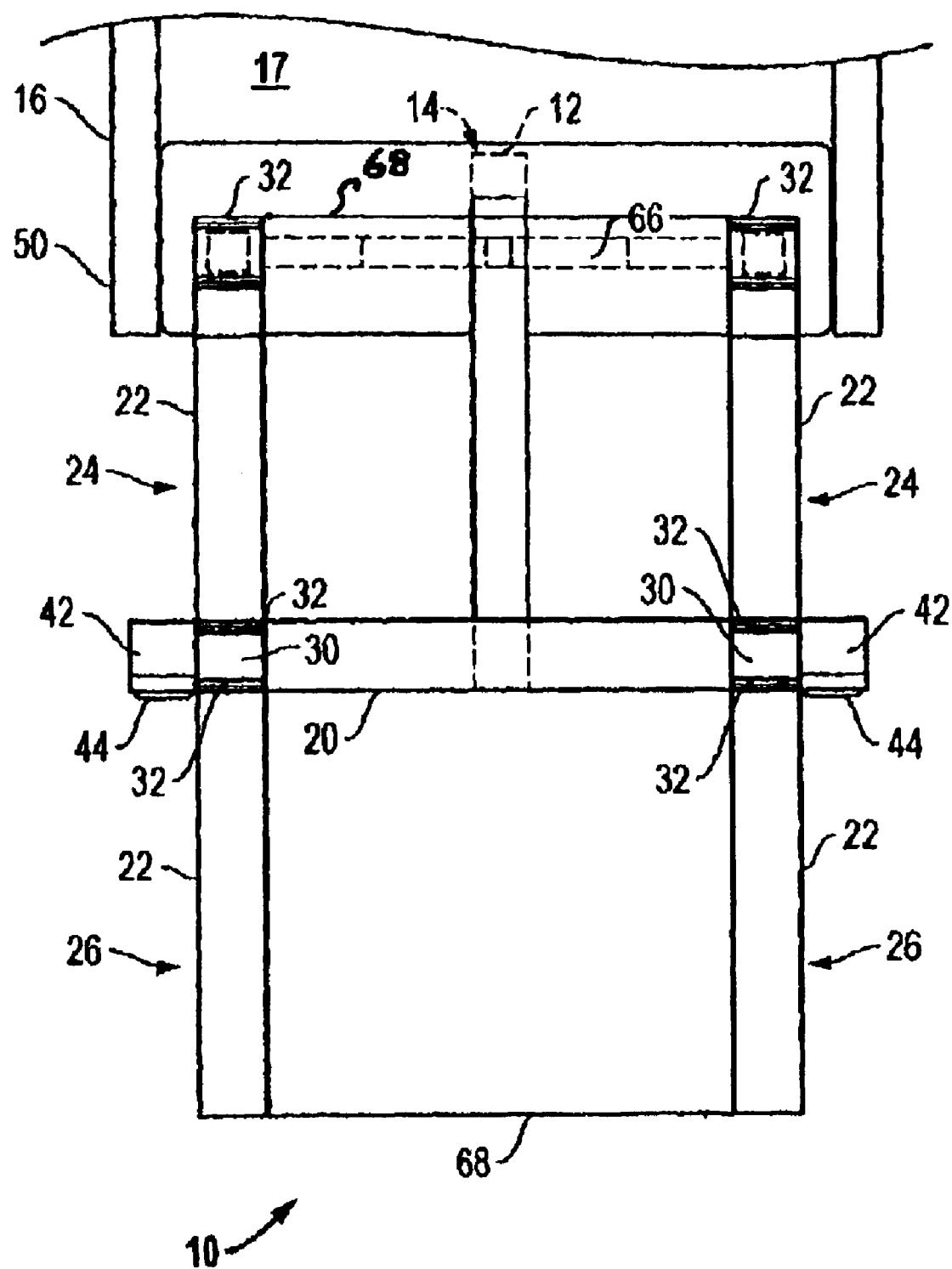
FIG. 4 is a top view of the invention of FIG. 1.

Support 20 is attached to hitch connect 12. Ramp 22 is attached to support 20. According to one embodiment of the invention, ramp 22 includes an upper ramp 24 and a lower ramp 26. Preferably, upper ramp 24 and lower ramp 26 are rotatably connected to support 20 by means of hinges 28. Hinges 28 may be any type of movable connection now known or hereafter developed. According to one aspect of the invention, as best seen in FIG. 4, a part 30 of support 20 forms a portion of ramp 22. According to another aspect of the invention, a wheel stop 32 is provided. As shown in FIG. 1, a wheel stop 32 is provided on part 30 of support 20 as well as at the end of upper ramp 24. As illustrated, wheel stop 32 may be triangular in shape as shown on part 30 or be a simple vertical stop as shown at the top of upper ramp 24. Any type of wheel stop 32 now known or hereafter developed is appropriate for the purposes of the invention. Also illustrated are wheel brackets 34. Wheel brackets 34 are designed to encompass the wheel 36 of the small vehicle 38 loaded on carrier apparatus 10.

According to one embodiment of the invention, strong back 40 is attached to hitch connect 12 enhancing the rigidity and support capacity of hitch connect 12. According to another aspect of the invention, step 42, attached preferably to support 20, provides easy access for a user to remove smaller vehicle 38 from carrier apparatus 10 as will be more fully described hereafter. Also provided in accordance with one embodiment of the invention, are lights 44. Lights 44 are connected to the electrical system of vehicle 16 at light connection 46, as is known in the art. According to another aspect of the invention, travel bars 48 are provided, as more fully described hereafter.

FIG. 1 shows carrier apparatus 10 in the loading position. In this position, lower ramp 26 is folded down until it contacts ground 18. Upper ramp 24 is lowered down onto tail gate 50 of vehicle 16. In this manner, tail gate 50 helps support and suspend carrier apparatus 10 in conjunction with the connection of hitch connect 12 in trailer receiver 14. As can be seen from FIG. 1, with a smaller vehicle 38, such as dirt bikes 52, fully loaded on carrier 10, substantially all of the truck bed 17 (not shown) is still available for use.

Referring now to FIG. 2, carrier apparatus 10 is shown in the travel position. In this illustration, small vehicle 38, four wheeler 54, has been driven onto carrier apparatus 10 such that the front wheels 36 of four wheeler 54 are firmly against wheel stop 32 on upper ramp 24. Additionally, rear wheels 36 are held in place by wheel stop 32 on parts 30 of support 20. Certainly, for safety, small vehicle 38 will be tied down and secured in any known manner. Nonetheless, however, wheel stops 32 are designed to securely and safely hold small vehicle 38 against movement once small vehicle 38 is properly located on carrier apparatus 10 as illustrated in FIG. 2.

Once loaded, lower ramp 26 is raised off of ground 18 and held in an upward position by a travel bar 48. It may be that lower ramp 26 is held in a completely vertical position or a slightly inclined position in accordance with a user's preference. In any event, once lower ramp 26 is secured in the upright position, no part or portion of carrier apparatus 10 is in contact with ground 18. That is to say, again, carrier apparatus 10 is fully suspended from vehicle 16 in accordance with the invention. Travel bars 48, according to one embodiment of the invention, are stiff metal bars, rotatably, movably attached to carrier apparatus 10 by hinges 28, for example only. Travel bars 48 are, according to one aspect of the invention, lightweight metal, aluminum, steel, or the like, and serve to hold carrier apparatus 10 in pre-designed positions, as described herein. Any type of mechanism for securing carrier apparatus 10 in these predetermined positions is appropriate in accordance with the invention.

Figure 3:
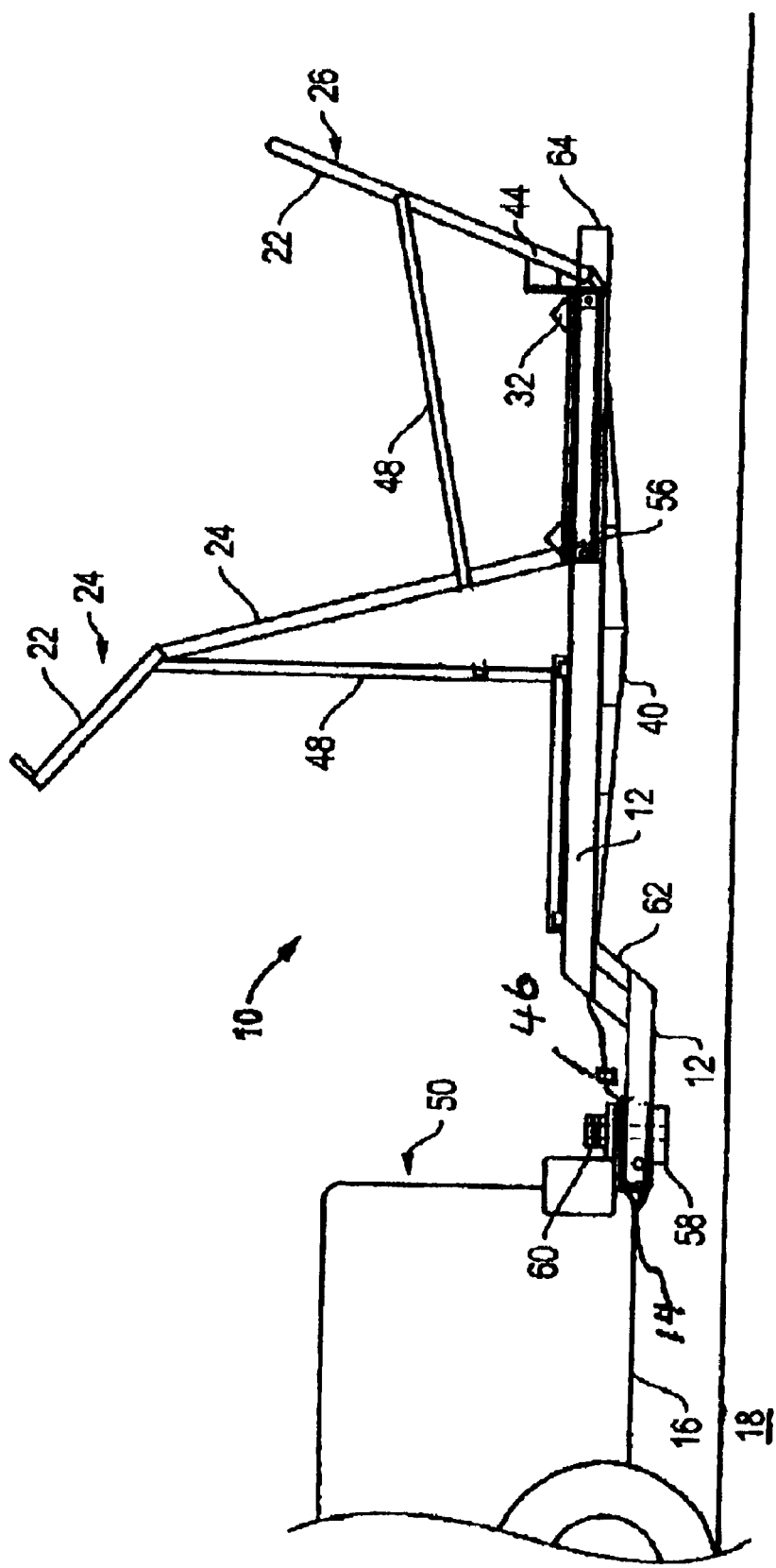
FIG. 3 is a side view of the invention of FIG. 1 empty in the travel position.

Referring now to FIG. 3, carrier apparatus 10 is shown suspended from vehicle 16 in the empty position. When carrier apparatus 10 is attached to, and suspended from, vehicle 16 in this empty condition, carrier apparatus 10 may be manipulated as described hereafter such that the tail gate 50 of vehicle 16 may be completely shut. As illustrated in FIG. 3, tail gate 50 is closed. Thus, vehicle 16, a pickup truck including the bed 17, is fully usable as a pickup truck even while carrier apparatus 10 is fully attached to and suspended from vehicle 16. In this position, travel bar 48 connects lower ramp 26 and the upper ramp 24. Once connected, both upper ramp 24 and lower ramp 26 may be rotated on hinges 28 until a second travel bar 48 is connected to upper ramp 24 as shown. In this position, carrier apparatus 10 is supported away from, and off, of tail gate 50 of vehicle 16. Stop 56 prevents carrier apparatus 10 from moving from this position FIG. 3 also illustrates another aspect of the invention according to one embodiment wherein a trailer receiver brace 58 is connected to vehicle 16. Trailer receiver brace 58 consists of a section of reinforcing metal, preferably, attached underneath trailer receiver 14 by means of bolts 60. In combination, bolts 60 and trailer receiver brace 58 greatly increase the ability of trailer receiver 14 to support hitch connect 12 and carrier apparatus 10 of the present invention. Applicants have determined that carrier apparatus 10 may support approximately 1500 pounds without trailer receiver brace 58 and approximately twice that amount, or 3000 pounds, with trailer receiver brace 58.

Still referring to FIG. 3, according to another aspect of the invention, goose neck 62 is attached to hitch connect 12 near trailer receiver 14 so as to raise the level of the remainder of hitch connect 12 as illustrated. This feature is useful with small and mid sized vehicles 16. Goose neck 62 may be attached by welding or any other means sufficient to secure it to hitch connect 12.

An additional embodiment is shown in FIG. 3 wherein an add-on receiver 64 is attached to the end of hitch connect 12 nearest the lights 44 as shown. This feature is useful in providing a user the ability to tow a normal wheeled trailer for a boat or the like if need be. Add-on receiver 64 is connected in any manner, such as by bolts, now known or hereafter developed.

Referring now to FIG. 4 a top view of the carrier apparatus 10 of the present invention is illustrated. In this view, truck bed 17 is clearly shown. Additionally, in this view, tail gate 50 is down and upper ramps 24 are resting on top of tail gate 50. In this configuration, carrier apparatus 10 is prevented from rocking in a side to side motion from one ramp 22 to the other ramp 22 by means of the combination of tail gate 50 and upper ramps 24. FIG. 4 also illustrates another embodiment of the invention wherein a stabilizer 66 is provided. Stabilizer 66 is attached to hitch connect 12 and to upper ramps 24 as illustrated. Stabilizer 66 has a "Y-shape," according to this embodiment. Stabilizer 66 is particularly useful when carrier apparatus 10 is utilized with a vehicle 16 that is not a pickup truck. For example, carrier apparatus 10 may be utilized with any type of vehicle 16 such as an SUV. In that case, stabilizer 66 prevents carrier apparatus 10 from rocking in a side to side motion.

FIG. 4 also illustrates another aspect of the invention according to one embodiment wherein optional stabilizer bars 68 are connected to upper ramps 24 and lower ramps 26 as illustrated. Stabilizer bars 68 ensure that ramps 22 move in unison and are kept in proper spatial relationship at all times. FIG. 4 also clearly illustrates the aspect of the present invention wherein parts 30 of support 20 form a portion of the ramp 22.

By way of further explanation, in use, a user with a vehicle 16 with a trailer receiver 14 slides hitch connect 12 into trailer receiver 14. Hitch connect 12 is then connected to trailer receiver 14 by any means now known or hereafter developed. Commonly, holes in the hitch connect 12 and trailer receiver 14 are aligned and a bolt is passed through them and secured in place. Any form of removable attachment of hitch connect 12 and trailer receiver 14 is appropriate in accordance with the present invention. Once attached, carrier apparatus 10 is fully supported off of groung 18 by means of the combination of hitch connect 12 with trailer receiver 14. In this position, carrier apparatus 10 appears as illustrated in FIG. 3. Thereafter, according to one aspect of the invention, tail gate 50. is lowered. Thereafter, travel bar 48, attached to the upper end of upper ramp 24, is disconnected. Thereafter, upper ramp 24 is lowered until coming in contact with tail gate 50. Again, tail gate 50 provides some additional support to carrier apparatus 10. Next, travel bar 48 is removed from lower ramp 26 and lower ramp 26 is allowed to contact ground 18. Stabilizer bars 68 ensure that lower ramps 26 are lowered together and in unison and are kept in proper spatial relationship.

At this point, carrier apparatus 10 appears in the position illustrated in FIG. 1. In this position, small vehicle 38, dirt bikes 52, four wheeler 54, or any other small vehicle now known or hereafter developed, is loaded onto carrier apparatus 10. Wheel stops 32 ensure that small vehicle 38 is held securely in position on carrier apparatus 10 in the loaded position. Thereafter small vehicle 38 may be otherwise secured in position as desired.

Next, lower ramps 26 are raised and held in the travel position illustrated in FIG. 2 by means of travel bar 48. At this point, a user may drive vehicle 16 to any location desired including remote hunting locations as discussed above. Once there, a user simply reverses the previously described loading process to unload small vehicle 38. After use, small vehicle 38 is then reloaded as described. At this point, carrier apparatus 10 has the advantage over prior art trailers in that very few parts are subject to wear and tear and breakage and no licenses or tags are required in most instances. Nonetheless, a primary substantial additional advantage of carrier apparatus 10 is that once small vehicle 38 is loaded onto carrier apparatus 10 in this remote location, vehicle 16 may be operated easily and simply. That is to say, as easy as vehicle 16 may be to maneuver alone, so it is with carrier apparatus 10 attached. Because carrier apparatus 10 is fully suspended from vehicle 16, no difficult vehicle and trailer combination backing skills are required. Vehicle 16 can be simply backed out of the remote location using ordinary backing skills and a rear view mirror. Still further, if desired, a user may simply back up vehicle 16 into the under brush with carrier apparatus 10 actually guarding vehicle 16 from damage from bushes and the like.

The description of he preferred embodiments of the invention have been presented for purposes of illustration but are not intended to be exhaustive or to limit the invention to the form disclosed. Many modifications and variations will be apparent to those of ordinary skill in the art. For example only and not by limitation, a steel mesh grill can be added to the lower ramps 26 so as to provide a full shield against bushes and the like when backing up. As such, while the present invention has been disclosed in connection with the preferred embodiment thereof, it should be understood that there may be other embodiments which fall within the spirit and scope of the invention as defined by the following claims.

What is claimed is:

1. In vehicles with a trailer receiver, a carrier apparatus, the apparatus comprising:
    a) a hitch connect suspended from the trailer receiver;
    b) a support attached to the hitch connect;
    c) a ramp attached to the support; and
    d) a trailer receiver brace connected to the trailer receiver.
2. The apparatus of claim 1 wherein said ramp is rotatably connected to the support.
3. The apparatus of claim 1 further including a wheel stop on said ramp.
4. The apparatus of claim 1 wherein the ramp is supported by the vehicle.
5. The apparatus of claim 1 wherein said hitch connect further includes a strongback.
6. The apparatus of claim 1 further comprising a step connected to the support.
7. The apparatus of claim 1 further comprising a ramp travel bar connected to the ramp.
8. The apparatus of claim 1 further including an add-on receiver attached to the hitch connect.
9. The apparatus of claim 1 wherein said hitch connect further includes a goose neck.
10. The apparatus of claim 1 wherein said ramp includes an upper and a lower ramp.
11. The apparatus of claim 10 further comprising ramp stabilizer bars connected to the upper and lower ramp.
12. The apparatus of claim 1 wherein said ramp includes a pair of upper ramps and a pair of lower ramps.
13. The apparatus of claim 12 wherein said ramps are rotatably connected to the support.
14. The apparatus of claim 1 wherein said support forms a part of said ramp.
15. The apparatus of claim 14 further including a wheel stop on the part of said support that forms a part of said ramp.
16. The apparatus of claim 1 further comprising a stabilizer connected to the hitch connect and to the ramp.
17. The apparatus of claim 16 wherein the stabilizer is Y-shaped.
18. In vehicles with a trailer receiver, a carrier apparatus, the apparatus comprising:
    a) a hitch connect suspended from the trailer receiver; and
    b) a H-shaped carrier attached to the hitch connect, the H-shaped carrier including a pair of ramps, wherein the ramps rest on the vehicle, and a cross connecting support.
19. The apparatus of claim 18 further including a trailer receiver brace attached to the vehicle.
20. The apparatus of claim 18 wherein the cross connecting support forms part of the ramps.
21. The apparatus of claim 18 further including at least one wheel stop connected to each ramp.
22. The apparatus of claim 18 further including ramp travel bars connected to the ramps.
23. In a vehicle with a trailer receiver, a carrier apparatus for carrying a small vehicle suspended from the back of the vehicle, the apparatus including:
    a) a hitch connect suspended from the trailer receiver;
    b) a H-shaped carrier attached to the hitch connect, the arms of the H formed by a pair of oppositely positioned ramps and the cross bar of the H formed by a cross connecting support attached to the ramps, wherein the ramps are moveably attached to the cross connection;
    c) a trailer receiver brace attached to the vehicle; and
    d) at least one travel bar attached to the H-shaped carrier.
24. The apparatus of claim 23 wherein each pair of said ramps further includes an upper and a lower ramp each moveably attached to the connecting support.
25. The apparatus of claim 23 wherein the upper pair of ramps rests on the vehicle.
26. The apparatus of claim 23 further including a strong back attached to the hitch connect.
27. The apparatus of claim 23 wherein the cross connecting support forms a portion of the ramps.
28. The apparatus of claim 23 wherein the small vehicle is selected from a group including: four wheelers and dirt bikes.
29. The apparatus of claim 23 further including a stabilizer attached to the hitch connect and to the H-shaped carrier.

30. The apparatus of claim 29 wherein the stabilizer is Y-shaped.

31. In a vehicle with a trailer receiver, a method of carrying a small vehicle, the method including the steps of:
   a) suspending a hitch connect from the trailer receiver;
   b) attaching a H-shaped carrier to the hitch connect; the H-shaped carrier including a pair of ramps and a cross connecting support;
   c) connecting a trailer receiver brace to the trailer receiver;
   d) lowering at least some of the ramps;
   e) driving the small vehicle up the ramps and securing it in place on the H-shaped carrier; and
   f) raising the ramps.

32. The method of claim 31 further including the step of selecting the small vehicle from a group including: four wheelers and dirt bikes.

33. In vehicles with a trailer receiver, a carrier apparatus, the apparatus comprising:
   a) a hitch connect suspended from the trailer receiver;
   b) a support attached to the hitch connect;
   c) a ramp attached to the support; and
   d) wherein said hitch connect further includes a strongback.

34. In vehicles with a trailer receiver, a carrier apparatus, the apparatus comprising:
   a) a hitch connect suspended from the trailer receiver;
   b) a support attached to the hitch connect;
   c) a ramp attached to the support; and
   d) further comprising a stabilizer connected to the hitch connect and to the ramp.

35. The apparatus of claim 34 wherein the stabilizer is Y-shaped.

36. In vehicles with a trailer receiver, a carrier apparatus, the apparatus comprising:
   a) a hitch connect suspended from the trailer receiver;
   b) a support attached to the hitch connect;
   c) a ramp attached to the support; and
   d) further including an add-on receiver attached to the hitch connect.

37. In vehicles with a trailer receiver, a carrier apparatus, the apparatus comprising:
   a) a hitch connect suspended from the trailer receiver;
   b) a support attached to the hitch connect;
   c) a ramp attached to the support; and
   d) wherein said hitch connect further includes a gooseneck.

* * * * *